United States Patent
Nichani et al.

(10) Patent No.: US 7,400,744 B2
(45) Date of Patent: *Jul. 15, 2008

(54) STEREO DOOR SENSOR

(75) Inventors: Sanjay Nichani, Natick, MA (US); Dave Schatz, Needham, MA (US); William Silver, Weston, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 643 days.

This patent is subject to a terminal disclaimer.

(21) Appl. No.: 10/388,925

(22) Filed: Mar. 14, 2003

(65) Prior Publication Data

US 2004/0045339 A1    Mar. 11, 2004

Related U.S. Application Data

(60) Provisional application No. 60/408,266, filed on Sep. 5, 2002.

(51) Int. Cl.
*G06K 9/00* (2006.01)

(52) U.S. Cl. .................. 382/103; 382/153; 382/154

(58) Field of Classification Search ............... 382/103, 382/154; 348/153
See application file for complete search history.

(56) References Cited

U.S. PATENT DOCUMENTS

| | | | |
|---|---|---|---|
| 3,727,034 A | 4/1973 | Pope | |
| 4,000,400 A | 12/1976 | Elder | |
| 4,303,851 A | 12/1981 | Mottier | |
| 4,799,243 A | 1/1989 | Zepke | |
| 4,847,485 A | 7/1989 | Koelsch | |
| 5,201,906 A | 4/1993 | Schwarz et al. | |
| 5,387,768 A | 2/1995 | Izard et al. | |
| 5,432,712 A * | 7/1995 | Chan | 382/191 |
| 5,519,784 A | 5/1996 | Vermeulen et al. | |
| 5,581,625 A | 12/1996 | Connell | |
| 5,866,887 A | 2/1999 | Hashimoto et al. | |

(Continued)

FOREIGN PATENT DOCUMENTS

EP    0 847 030 A2    6/1998

(Continued)

OTHER PUBLICATIONS

Gluckman et al.; "Planar Cadtadioptric Stereo: Geometry and Calibration", IEEE, 1999.☐☐.*

(Continued)

*Primary Examiner*—Bhavesh M. Mehta
*Assistant Examiner*—John B Strege
(74) *Attorney, Agent, or Firm*—Brian Michaelis

(57) ABSTRACT

A stereo imaging based vision system to monitor the area on the two sides of either a door and control door motion according to the motion of 3D objects in the viewing area. The system calibrated to provide heights above the ground plane for any point in the field of view. Therefore, when any object enters the field of view, it generates interest points called "features", the heights of which are measured relative to the ground plane. These points are then clustered in 3D space to provide "objects". These objects are then tracked in multiple frames to provide "trajectories". Such a system could then control the door motion (open, close, stall) based on the various pieces of information generated about the object.

18 Claims, 6 Drawing Sheets

Layout of the SDS System

U.S. PATENT DOCUMENTS

| | | | |
|---|---|---|---|
| 6,028,626 | A | 2/2000 | Aviv |
| 6,081,619 | A | 6/2000 | Hashimoto et al. |
| 6,173,070 | B1 | 1/2001 | Michael et al. |
| 6,195,102 | B1 | 2/2001 | McNeil et al. |
| 6,205,242 | B1 | 3/2001 | Onoguchi |
| 6,215,898 | B1* | 4/2001 | Woodfill et al. ............. 382/154 |
| 6,226,396 | B1* | 5/2001 | Marugame ................. 382/154 |
| 6,297,844 | B1* | 10/2001 | Schatz et al. ................. 348/43 |
| 6,307,951 | B1 | 10/2001 | Tanigawa et al. |
| 6,345,105 | B1 | 2/2002 | Nitta et al. |
| 6,408,109 | B1 | 6/2002 | Silver |
| 6,469,734 | B1 | 10/2002 | Nichani et al. |
| 6,496,220 | B2* | 12/2002 | Landert et al. ............. 348/143 |
| 6,678,394 | B1 | 1/2004 | Nichani |
| 6,701,005 | B1* | 3/2004 | Nichani ..................... 382/154 |
| 6,756,910 | B2* | 6/2004 | Ohba et al. ............. 340/686.6 |
| 6,791,461 | B2 | 9/2004 | Oku et al. |
| 6,963,661 | B1* | 11/2005 | Hattori et al. ............... 382/154 |
| 7,003,136 | B1 | 2/2006 | Harville |
| 7,058,204 | B2 | 6/2006 | Hildreth et al. |
| 7,088,236 | B2 | 8/2006 | Sorensen |
| 2001/0010731 | A1 | 8/2001 | Miyatake et al. |
| 2001/0030689 | A1 | 10/2001 | Spinelli |
| 2002/0039135 | A1 | 4/2002 | Heyden |
| 2002/0118113 | A1* | 8/2002 | Oku et al. ................ 340/573.1 |
| 2002/0118114 | A1 | 8/2002 | Ohba et al. |
| 2002/0135483 | A1 | 9/2002 | Merheim et al. |
| 2002/0191819 | A1 | 12/2002 | Hashimoto et al. |
| 2003/0053660 | A1 | 3/2003 | Heyden |
| 2003/0071199 | A1 | 4/2003 | Esping et al. |
| 2004/0017929 | A1* | 1/2004 | Bramblet et al. ............ 382/103 |
| 2005/0074140 | A1 | 7/2005 | Grasso et al. |

FOREIGN PATENT DOCUMENTS

| | | |
|---|---|---|
| EP | 0 847 030 A3 | 12/1999 |
| EP | 0 706 062 B1 | 5/2001 |
| EP | 0 817 123 | 9/2001 |
| WO | WO-96/31047 | 10/1996 |
| WO | WO 96/38820 | 12/1996 |
| WO | WO 98/08208 | 2/1998 |
| WO | WO-01/75809 | 10/2001 |
| WO | WO-02/48971 | 6/2002 |
| WO | WO-02/095692 | 11/2002 |

OTHER PUBLICATIONS

Burschka et al.; "Scene Classification from Dense Disparity Mapis in Indoor Environments", Proceedings of ICPR 2002, Aug. 2002.*

Weng; "Agglomerative Clustering Algorithm", www.speech.sri.com, 1997.*

Jain et al.; Machine Vision, Chapter 11—Depth p. 289-297, MIT Press and McGraw-Hill Inc., 1995.*

Dhond et al.; "Structure from Stereo—A Review", IEEE TRansactions on Systems, Man, and Cybernetics, vol. 19 No. 6, Dec. 1989.*

Prati, A. , et al., "Detecting Moving Shadows: Algorithms and Evaluations", *IEEE Transactions on Pattern Analysis and Machine Intelligence*, vol. 25, No. 7,(2003), pp. 918-923.

R. Y.Tsai, "A Versatile Camera Calibration Technique for High-Accuracy 3D Machine Vision Metrology using off-the-shelf TV Cameras and Lenses," IEEE J. Robotics and Automation, vol. 3. No. 4. pp. 323-344.

Z. Zhang, "A Flexible New Technique for Camera Calibration," Technical Report MSR-TR-98-71, Microsoft Research, Microsoft Corporation, pp. 1-22 (Mar. 25, 1999).

T. Kanade et al., "A Stereo Machine for Video-rate Dense Depth Mapping and Its New Applications," Proc. IEEE Computer Vision and Pattern Recognition (CVPR), pp. 196-202.

R.E. Kalman, "A New Approach to Linear Filtering and Prediction Problems," Transactions of the ASME, The Journal of Basic Engineering, 8:35-45, 1960.

Gurovich Alexander, Fiksman Evgeny, "Automatic Door Control using Motion Recognition", Technion, Isreal Institute of Technology, Aug. 1999.

Jeffery S. Norris, "Face Detection and Recognition in Office Environments", Department of Electrical Engineering and Computer Science, Massachusetts Institute of Technology, (May 21, 1999).

Pollard, Stephen P., et al. "a Stereo Correspondence Algorithm using a disparity gradient limit", Perception, vol. 14, (1985), 449-470.

* cited by examiner

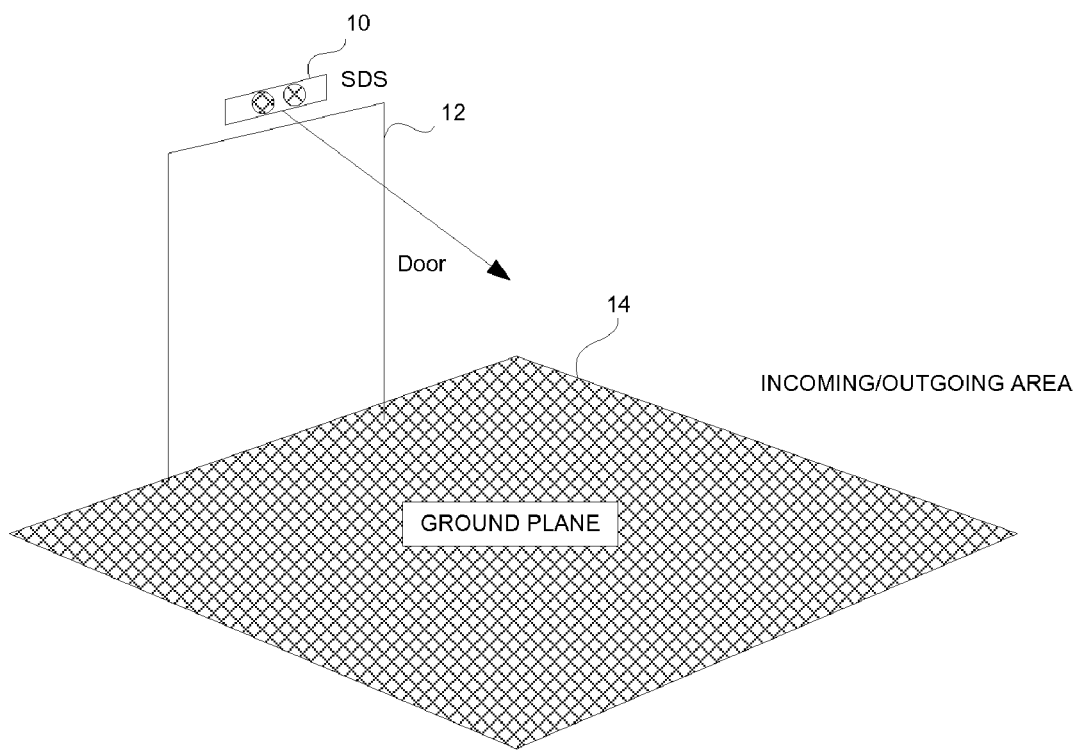
FIGURE 1. Layout of the SDS System

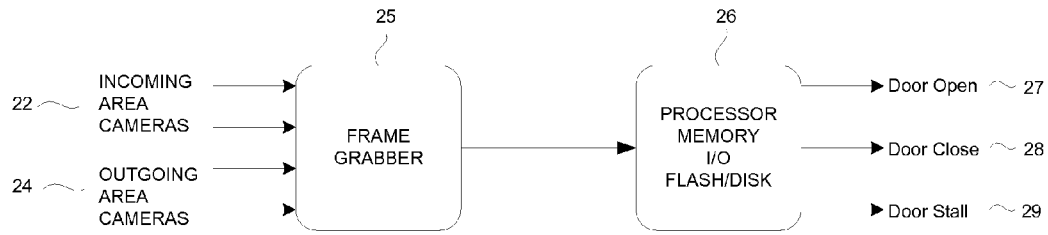
FIGURE 2. System Configuration 1
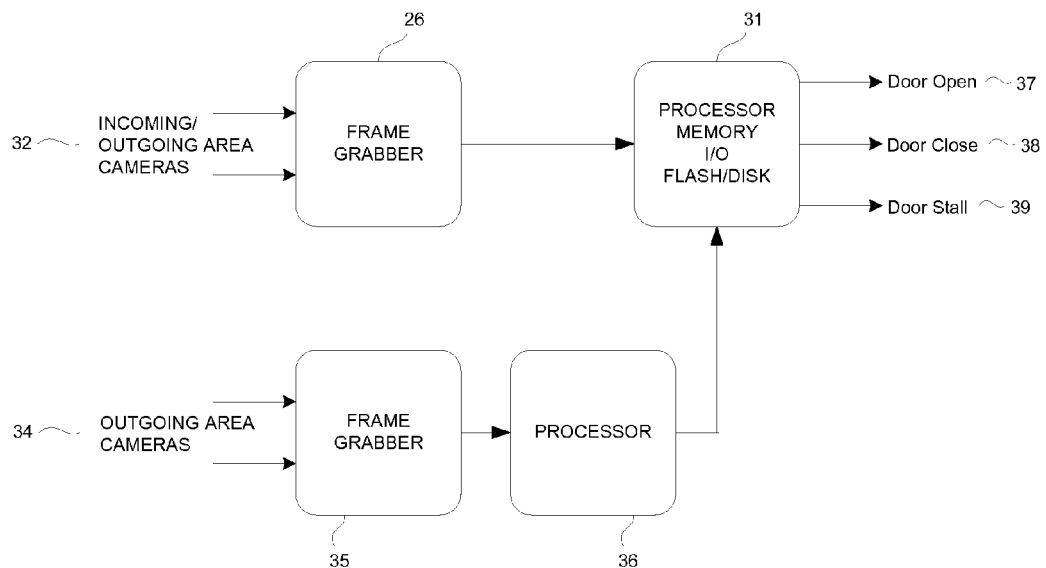
FIGURE 3. System Configuration 2

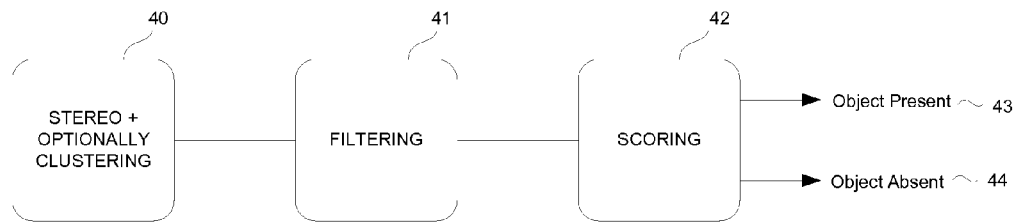
FIGURE 4. Algorithm 1
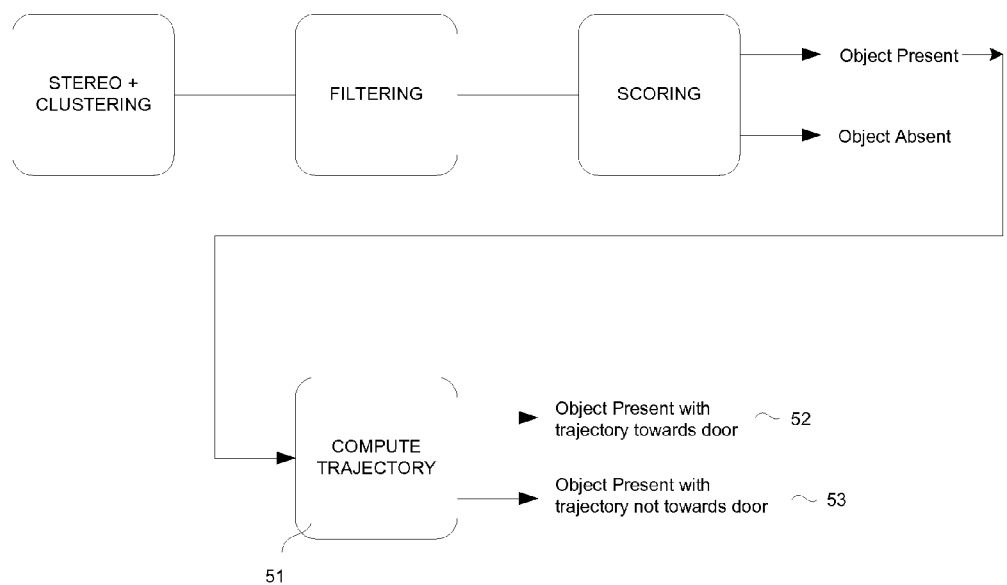
FIGURE 5. Algorithm 2

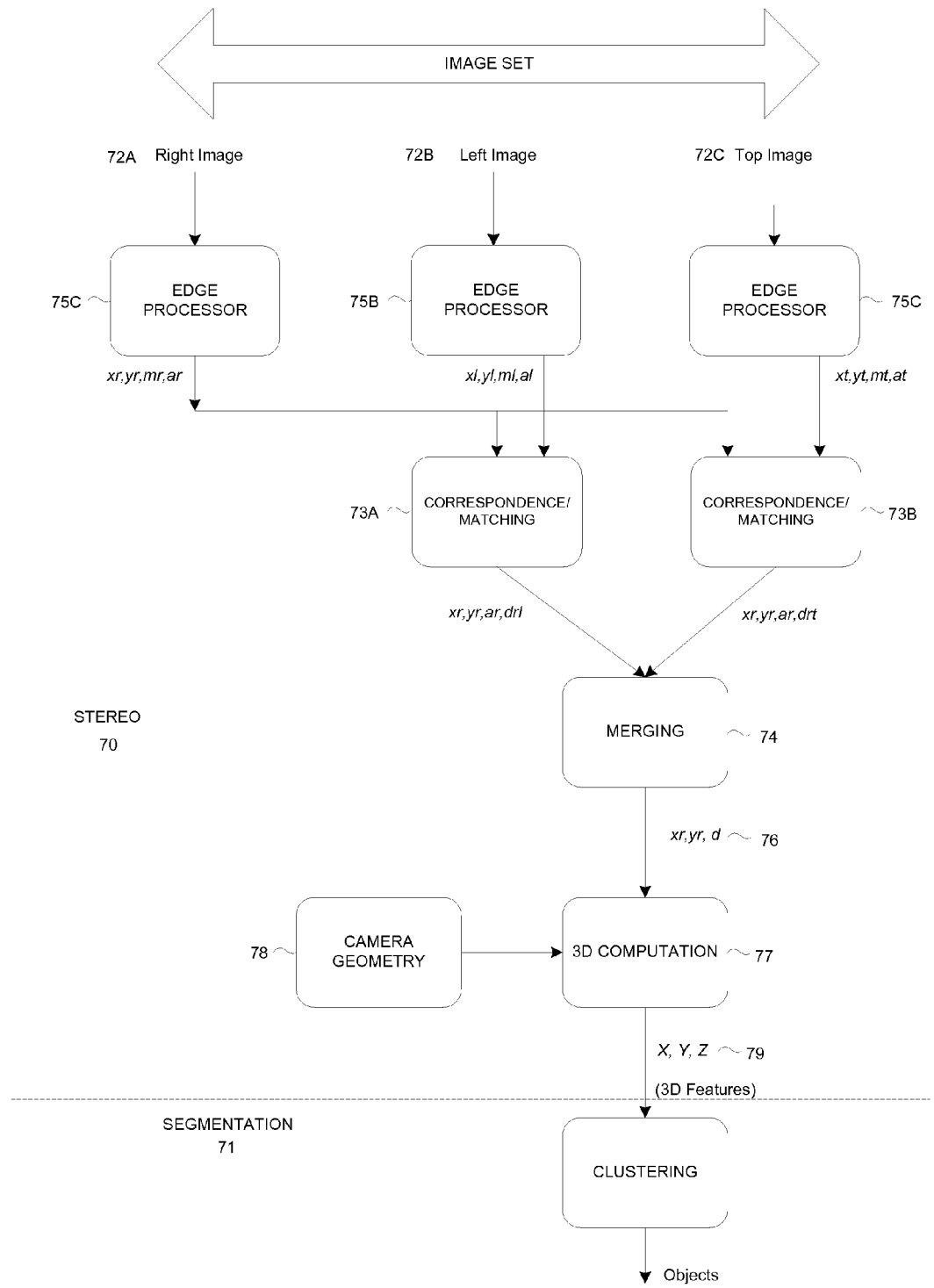
FIGURE 7. Stereo Matching

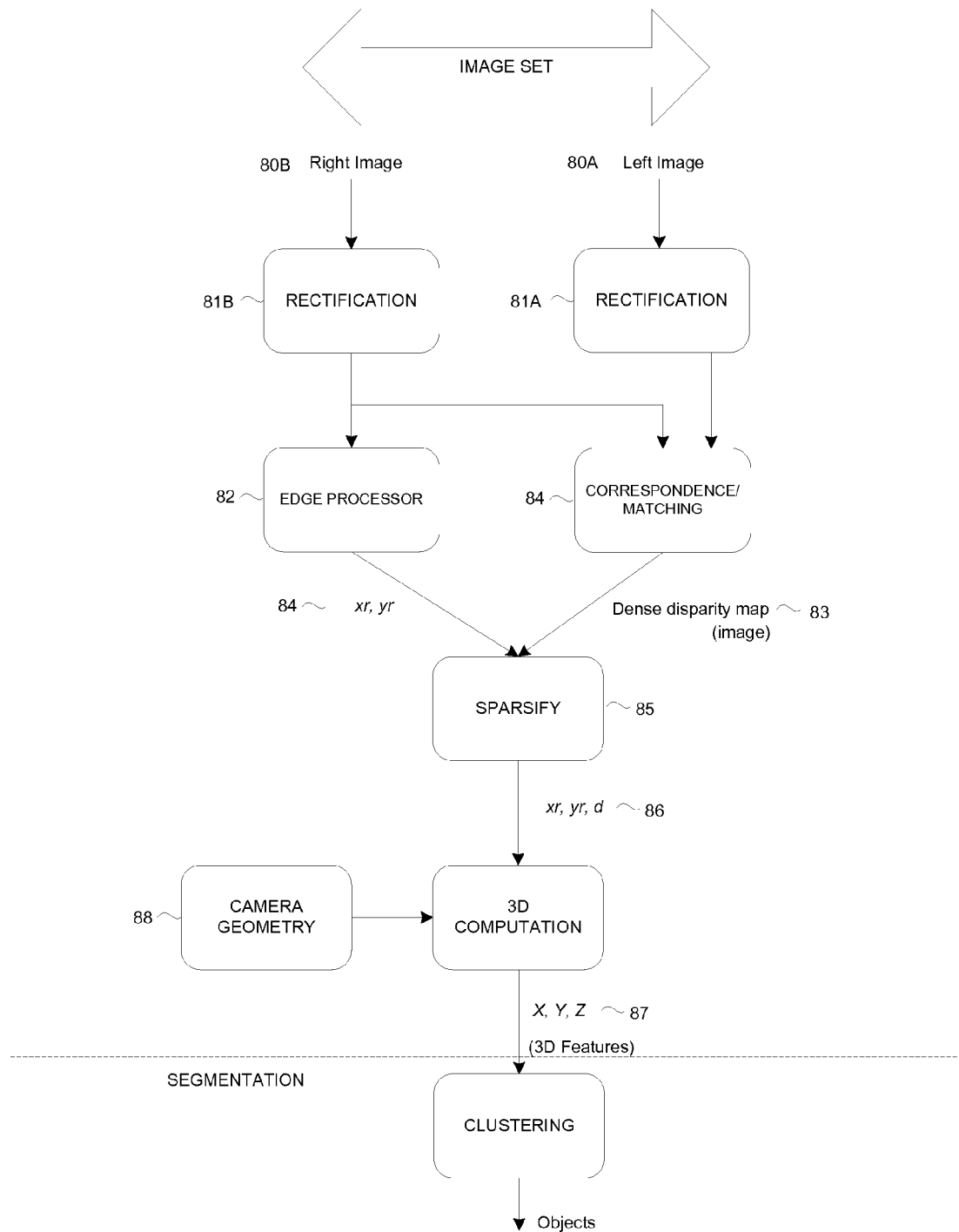
FIGURE 8. Stereo Alternative Embodiment

STEREO DOOR SENSOR

CROSS REFERENCE TO RELATED APPLICATION

This application claims the benefit of U.S. Provisional Patent Application Ser. No. 60/408,266, entitled "Stereo Door Sensor," filed on Sep. 5, 2002.

FIELD OF THE INVENTION

The present invention relates to machine vision systems and more particularly to a method and apparatus using an automated stereo vision system to control operation of a door.

BACKGROUND OF THE INVENTION

Various sensors are known for use in automatic object detection and control systems. For example, photo voltaic sensors detect objects interrupting a beam of visible or UV light. Mechanical switches and load cells detect objects through direct or indirect contact or by detecting an object weight. Thermal sensors detect objects radiating heat, and electro-magnetic sensors detect objects such as metal objects that alter electromagnetic fields. These sensors typically send signals to logic circuits which control mechanical actuators, record the object's presence and/or alert an operator based on the presence or absence of an object.

Such sensors are not well suited for certain applications because they are easily circumvented. They only detect a certain class of objects moving through a narrowly constrained space. Similarly, they can not directly determine an object direction or velocity. These sensors often have problems maintaining uniform sensitivity throughout a monitored space or over time, and they can be prohibitively expensive.

In some applications, more than one sensor is necessary. For example, typical automatic door controllers used in most grocery stores use a microwave sensor or ultrasound sensor to detect a person approaching a door. An infra-red motion detector is often used to determine whether a person is loitering in a doorway before allowing the doors to close.

Various camera based systems are also known for use in object detection systems and control systems. Camera based systems have the additional advantage of providing an image of the monitored space which can be stored for later analysis. Such systems typically use an electronic still camera or an electronic video camera which captures images on an array of charge coupled devices (CCDs) and converts the images into electronic data files for automatic analysis or storage. For example, automatic face recognition systems have long been the subject of experimentation and are now in use in several high security applications. These systems can be too slow, expensive or unreliable for most common applications.

Motion detection systems have been developed using electronic video cameras and frame capturing processes which detect and track certain features in each frame a captured video sequence. For example, automatic door control systems are known that tracks corners of an object from frame to frame and calculating a velocity vector for the object. The velocity vector is used to determine whether to open or close an automatic door.

Heretofore known feature tracking systems, like the referenced corner tracking system described in the Alexander article, extract data from a monocular image sequence. Such monocular systems provide only 2 dimensional (2-D) from which to compute velocity vectors. Such monocular systems have difficulty distinguishing shadows and lighting effects from actual 3-dimensional objects. This problem is exacerbated in certain security systems wherein, for example, a pre-alarm condition triggers a warning strobe light that affects detected images of the monitored space.

Monocular video monitoring systems operating on 2-D image data must tolerate blind spots or blind intervals during which regular obstructions appear in the camera's field of view. For example, some doors or doorframes being controlled by monocular video systems can come into the field of view of the monitoring cameras whenever they are opened. Some systems are programmed to ignore frames or frame segments whenever the door is opened. Other more refined systems use additional sensors to detect a door's actual position over time and ignore only the portions of a frame where the door or door frame is expected to appear, see for example U.S. Patent Application No. US2001/0030689 to Spinelli.

When monocular vision motion detection systems are first installed they must be "trained" using a reference image in order to establish a frame of reference appropriate to the particular environment. Such training can often involve tedious and expensive procedures. Image coordinates are calculated, stored or output in 2-D image space because real 3-D coordinates are unavailable in monocular systems.

SUMMARY OF THE INVENTION

The present invention provides an automatic door controlled by signals from a stereo vision system. A stereo image of an approach area is processed to generate a disparity image. The disparity image is used by a controller to determine whether to open or close a door.

Embodiments of the present invention use a factory calibrated stereo system that provides 3D coordinates of points in the field of view. At installation time the plane of the ground is calibrated relative to the camera. Only those points that have some height relative to the ground plane are of interest. Therefore, any shadows and highlights can be filtered out due to their lack of height relative to the ground plane. The points of interest are then clustered either directly in 3D space or their projections are clustered on the ground plane in a 2D space. Each separate cluster is considered an object and is tracked from frame to frame. Therefore, at each frame selected information is available including, the number of objects; their positions in 3D space (centroid); and the instantaneous motion vector (magnitude and direction). Using this raw data, events can be generated to open or close a door.

In an illustrative embodiment of the invention, a stereo door sensor (SDS) includes a stereo imaging based vision system to monitor the area on one or two sides of a door such as a sliding or a swinging door. The area where the traffic enters the door will be referred to as the incoming area and the area where the traffic exits the door will be referred to as the outgoing area. The floor of either the incoming area or the outgoing area will be referred to as the ground plane.

Such a system could trigger, not trigger or assume a safe state based on a variety of situations. For example, it could trigger in the presence of an object in the incoming area to open or close a door. Alternatively, it could trigger based on the trajectory of the object(s) in the incoming area. Also such a system could be in a state to not trigger or assume a safe state (based on the door type) due to the presence of an object in the outgoing area.

Since the present invention comprises a camera based system, it is possible to record images (useful in the event of an intrusion) and also collect traffic flow statistics using various embodiments of the invention. A frame-to-frame motion algorithm according to various embodiments of the present invention could also be more generally applicable in any number of applications without departing from the spirit and scope of the present invention.

Other features and advantages of the various embodiments of the present invention with respect to heretofore known camera based motion detection and control systems include superior shadow discrimination and background invariance. Due to the 3D nature of stereo systems it is easier to discriminate between shadows and an actual object. The shadows lie on the ground plane (zero height) as opposed to an actual object. The SDS according to the invention ("SDS") will work with any background, structured or unstructured. This is particularly important due the variety of surfaces present under a door i.e. carpet, concrete, mats etc. Further the appearance of these surfaces change with the passage of time. Problems caused by shadows and highlights in the prior art are thus eliminated in the various embodiments of the present invention because detection of an object's motion in the present invention is based on physical coordinates rather than on appearance of background.

The present invention also features easy installation and set up without requiring initial training procedures. SDS involves only a one-time installation setup and requires no further training of any sort. This feature provides a distinct advantage relative to monocular motion based systems which usually require a reference image to compare with captured images. Another advantage of the system is that stationary or slow moving objects do not become invisible as they would to a motion detection system.

The present invention also features trajectory based triggering whereby SDS is able to segment objects in 3D space and track them using a custom algorithm, such as Patquick available from Cognex Corp. of Natick Mass., which is far superior to tracking their projections in 2D image space using standard block matching methods.

The present invention also features a calibrated 3D system whereby SDS is calibrated in real world units. The invention is thereby able to accept setup parameters and triggers based on real world heights and distances.

The present invention also features optional storage of stereoscopic images for a predefined time interval. This option can provide video evidence of a mishap or can be used to reconstruct a full 3D scene over an extended period. Such extended data can provide a more objective base for analysis.

The present invention also features a flexible masking capability. The masking capability allows a user during set up to graphically specify zones to be masked out in either 2D or in 3D. This feature can be used, for example, to account for either non-custom doorways or stationary background scenery in the field of view.

The present invention also features elimination of excessive blind spots. A non-stationary background like the door opening motion itself (into the outbound area) can be effectively masked out by first detecting the doorframe and then simply ignoring points that lie on that plane. Such a system is always operational and does not have any blind intervals.

Accordingly, the present invention is easier to use and more robust than heretofore known motion detection and control systems.

BRIEF DESCRIPTION OF THE DRAWINGS

The foregoing and other features and advantages of the present invention will be more fully understood from the following detailed description of illustrative embodiments taken in conjunction with the accompanying drawings in which:

FIG. 1 is a schematic diagram of a stereo door sensor layout according to an illustrative embodiment of the present invention;

FIGS. 2 and 3 are schematic block diagrams of alternative configurations of system components of illustrative embodiments of the present invention;

FIGS. 4 and 5 are process flow diagrams showing the steps of alternative illustrative embodiments of the present invention;

FIGS. 7 and 8 are process flow diagrams showing the steps of stereo matching processes according to alternative illustrative embodiments of the present invention.

DETAILED DESCRIPTION

Figure 6:
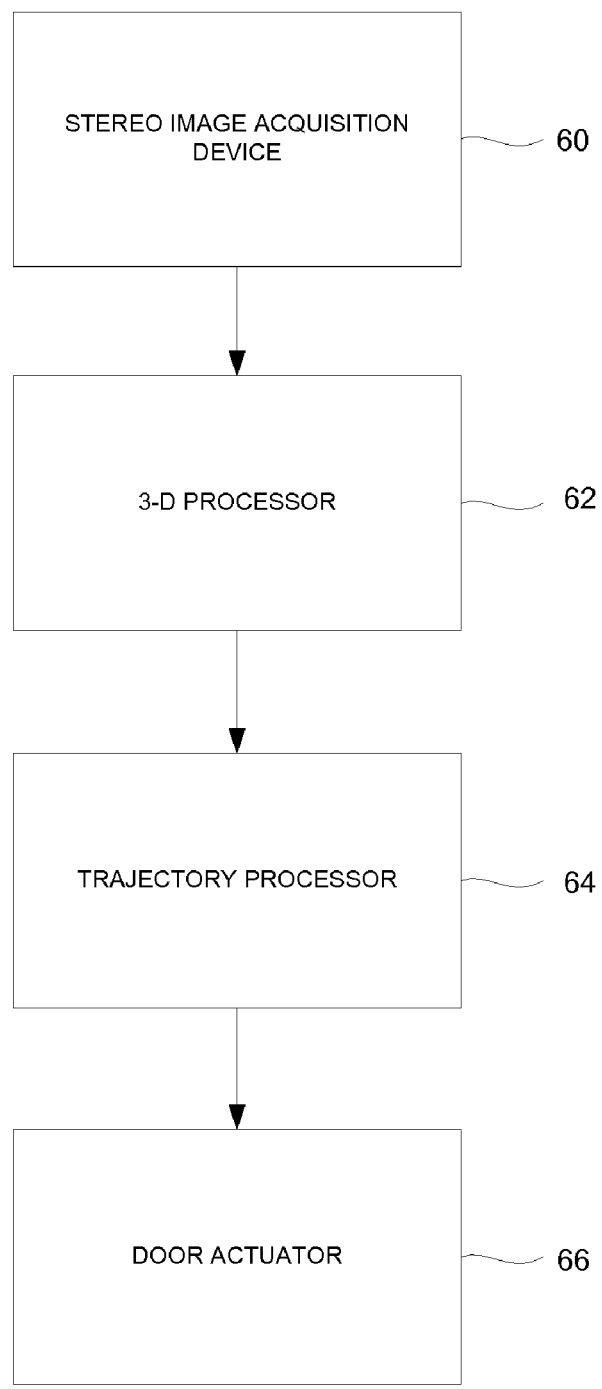
FIG. 6. is a schematic block diagram of a stereo door sensor apparatus according to an illustrative embodiment of the present invention.

The layout of an illustrative embodiment of the present invention is described with reference to FIG. 1. The illustrative embodiment includes a set of stereo cameras 10 mounted on the top of a doorframe 12 looking downward and outward towards the incoming area 14. Optionally, another set of cameras (not shown) can be mounted on the other side of the doorframe looking at the outgoing area. The invention is calibrated to provide heights above the ground plane for any point in the field of view. Therefore, when any object enters the field of view, it generates interest points called "features", the heights of which are measured relative to the ground plane. These points are then clustered in 3D space to provide "objects". These objects are then tracked in multiple frames to provide "trajectories". Such a system could then operate the door (open, close, stall) based on the various pieces of information generated about the object.

In the illustrative embodiment, the following geometry for the placement of cameras is used. Two (or three) stereo cameras 10 view the incoming area 14 and optionally another two (or three) stereo cameras (not shown) view the outgoing area. The two sets of cameras are mounted above and on either side of the doorframe 12 and are looking downward and outwards from the doorframe. FIG. 1 shows the geometry for only the incoming area. The geometry for the outgoing area in the illustrative embodiment is reflected and symmetric about the doorframe (though it need not be).

In an exemplary system, the baseline distance between the optical centers of the cameras is 12 mms and the lenses have a focal length of 4 mm (70 degree Horizontal Field of View (HFOV)). The cameras are mounted approximately 2.2 meters from the ground and have a viewing area that is approximately 2.5 by 2.5 meters. The surface normal to the plane of the cameras points downward and outward as shown in FIG. 1 wherein the cameras are angled just enough to view the bottom of the doorframe. Camera angles in the exemplary system provide some overlap between the fields of view of the incoming camera set and the outgoing camera at the bottom of the doorframe.

At least two possible system configurations can be used to implement the present invention. In a first illustrative system configuration as shown in FIG. 2, the systems monitoring the incoming area and outgoing area are tightly integrated. A frame grabber 20 receives input from both incoming area cameras 22 and outgoing area cameras 24 and processed on a processing system 26. The processing system outputs an appropriate control signal 27, 28, 29.

In a second illustrative system configuration as shown in FIG. 3, independent systems monitor incoming and outgoing areas separately. A separate frame grabber 30, 35 receives input from either an incoming 32 or outgoing camera set 34. A separate processor 31, 36 processes the respective outputs from each frame grabber 30, 35. In this configuration, the monitoring of the outgoing area is optional. If monitoring of both the incoming area and outgoing area is performed, one sub-system is designated as a master and the other as a slave. The outputs of the slave sub-system, here shown as the outgoing camera system, are then input to the master subsystem allowing the master sub-system to make a final decision as to whether to open, close or stall the door.

In the illustrative embodiment of the present invention various parameters are set up in the factory. The factory setup involves calibration and the computation of the intrinsic parameters for the cameras and the relative orientation between the cameras. Calibration involves the solution of several sub-problems, as discussed hereinafter, each of which has several solutions that are well understood by persons having ordinary skill in the art. Further, rectification coefficients, described hereinafter, must be computed to enable run time image correction.

Stereo measurements could be made in a coordinate system that is different from the coordinate systems of either camera. For example, the scene or world coordinates correspond to the points in a viewed scene. Camera coordinates (left and right) correspond to the viewer-centered representation of scene points. Undistorted image coordinates correspond to scene points projected onto the image plane. Distorted image coordinates correspond to points having undergone lens distortion. Pixel coordinates correspond to the grid of image samples in the image array.

In the illustrative embodiment one camera is designated to be a "reference camera", to which the stereo coordinate system is tied. An interior orientation process is performed to determine the internal geometry of a camera. These parameters, also called the intrinsic parameters, include the following: effective focal length, also called the camera constant; location of the principal point, also called the image center; radial distortion coefficients; and horizontal scale factor, also called the aspect ratio. The cameras used in the illustrative embodiment have fixed-focus lenses that cannot be modified; therefore these parameters can be computed and preset at the factory.

A relative orientation process is also performed to determine the relative position and orientation between two cameras from projections of calibration points in the scene. Again, the cameras are mechanically fixtured such that they stay in alignment and hence these parameters can also be preset at the factory.

A rectification process, closely associated with the relative orientation, is also performed. Rectification is the process of resampling stereo images so that epipolar lines correspond to image rows. "An epipolar line on one stereo image corresponding to a given point in another stereo image is the perspective projection on the first stereo image of the three-dimensional ray that is the inverse perspective projection of the given point from the other stereo image." Robert M. Haralick & Linda G. Shapiro, *Computer and Robot Vision Vol. II* 598 (1993). If the left and right images are coplanar and the horizontal axes is collinear (no rotation about the optical axis), then the image rows are epipolar lines and stereo correspondences can be found along corresponding rows. These images, referred to as normal image pairs provide computational advantages because the rectification of normal image pairs need only be performed one time.

The method for rectifying the images is independent of the representation used for the given pose of the two cameras. It relies on the principal that any perspective projection is a projective projection. Image planes corresponding to the two cameras are replaced by image planes with the desired geometry (normal image pair) while keeping the geometry of the rays spanned by the points and the projection centers intact. This results in a planar projective transformation. These coefficients can also be computed at the factory.

Given the parameters computed in interior orientation, relative orientation and rectification, the camera images can be corrected for distortion and misalignment either in software or hardware. The resulting corrected images have the geometry of a normal image pair i.e., square pixels, aligned optical planes, aligned axes (rows), and pinhole camera model.

An exterior orientation process is also performed during factory set up of the illustrative embodiment. The exterior orientation process is needed because 3D points in a viewed scene are only known relative to the camera coordinate system. Exterior orientation determines the position and orientation of a camera in an absolute coordinate system. An absolute 3D coordinate system is established such that the XY plane corresponds to the ground plane and the origin is chosen to be an arbitrary point on the plane.

Ground plane calibration is performed at the location of the installation. Calibration targets are laid out in the floor to compute the relationship between the stereo coordinate system attached to the reference camera and the world or scene coordinates system attached to the ground plane.

Regions of interest are also set up manually at the location of the installation. This involves capturing the image from the reference camera (camera that the stereo coordinate system is tied to), rectifying it, displaying it and then using a graphics overlay tool to specify the zones to be monitored. Multiple zones can be pre-selected to allow for different run-time algorithms to run in each of the zones. The multiple zones typically include particular 3D spaces of interest. Filtering is performed to eliminate features outside of the zones being monitored. In alternative embodiments of the invention, automatic setup can be performed by laying out fiducial markings or tape on the floor. While there are several methods to perform stereo vision according to the present invention, one such method is outlined below with reference to FIG. 7. The stereo block 70 takes a set of input images 72A, 72B, 72C (Right, Left, Top) and produces the 3D location of the edge or boundary points in the reference image. Inputs from three cameras are shown, although two cameras will suffice in most cases, especially if the features predominantly occur in one orientation. For example, if the features are vertical, then horizontally placed right and left cameras will be able to provide good 3D information, such as in the case of the door sensor application.

During an edge processing step 75A, 75B, 75C a stereo algorithm uses a feature detection scheme which includes parabolic smoothing, non-integral sub-sampling (at a specific granularity), Sobel edge detection followed by true peak detection and finally chaining. This feature detection scheme is known in the art and available in the Patmax products by Cognex Corporation, of Natick Mass. The edge processing step 75A, 75B, 75C results in a list of connected edgelets (chains). Only features that belong to long enough chains are passed on to the next stage. For example, only chains exceeding a predetermined length are identified as features to be passed along. In FIG. 7, features with x, y location and their gradient magnitude (m) and angle (a) for the three cameras r, l, t are passed to the matcher.

A matching process (also called a correspondence procedure) 73A, 73B is used to match features from the right image 72A to the left image 72B (horizontal disparities) and also the right image 72A to the top image (vertical disparities) 72C. The initial set of possible matches for each feature is constrained using the epipolar constraint. A match between a feature in two images is then characterized by an initial strength of match (SOM), by comparing the strength and orientation of the edgelets.

Next, smoothness constraint is enforced by limiting the allowable disparity gradient; this provides a suitable balance between disambiguating power and the ability to deal with wide range of surfaces. This step involves updating the SOM of each correspondence by looking at correspondences of the neighbors of the features under consideration. Next an iterative winner-take-all procedure that enforces the uniqueness takes over. The method works as follows: At each iteration those matches for which the matching strength is maximum for both of the features forming them is chosen as correct. Then, because of the uniqueness constraint, all other associated matches with these two features are eliminated from further consideration. This allows further matches to be selected as correct provided that they now have the highest strength for both constituent tokens. The matcher 73A, 73B outputs the x and y locations of feature points in the reference image (xr, yr) and the disparities in horizontal and vertical directions (dri, drt). The angles of features are also output (ar) to facilitate merging.

The horizontal and the vertical disparities are then merged 74 to produce a consolidated output. In the illustrative embodiment, a very simple multiplexing scheme is used. If the orientation of the feature is between 45 and 135 or between 225 and 315, the horizontal disparities are used, otherwise the vertical disparities are used. Note that if only two cameras are used then there is no need to perform a merging step 74. The output of the merger 74 is a plurality of feature points with disparities (xr, yr, d) 76.

Once the locations and disparities 76 of feature points are computed and camera geometry 78 is known (due to calibration) the X, Y and Z location 79 of the points in either the stereo camera or scene coordinate systems are computed 77.

An optional step of segmentation 71 (also called clustering) can be performed. The segmentation step 71 returns distinct 3D objects in the scene wherein each object contains a mutually exclusive subset of the 3D boundary points output by the stereo algorithm.

Matching methods can be classified as feature based (as the one described above with respect to FIG. 7) and area based methods. Feature based techniques are more view-point tolerant but produce sparse results. Area correlation (matching) techniques produce dense results and are less view-point tolerant. The area correlation techniques have extremely regular algorithmic structure, therefore are more easily optimized. Examples of commonly known correlation measures used by known third party systems include the SAD (Sum of Absolute differences) of the LOG (Laplacian of Gaussian) transformed image.

The dense disparity image can be processed using standard image processing techniques like histograms, blob connectivity to determine if there is significant height above the ground plane. However, these provide only crude estimates. Therefore, it is desirable to convert the dense disparity map into a sparse point cloud. This can be achieved by considering only those disparity pixels in the dense map that are "valid". FIG. 8 outlines a method to produce sparse disparities using known correlation techniques.

Like the method described hereinbefore with respect to FIG. 7, the alternative method described with reference to FIG. 8 focuses on the boundary points or edges (due to occlusion and reflectance) because the information is most reliable only at these points. The right and left images 80B, 80A are rectified 81B, 81A and passed to a matcher 84 which produces a dense disparity map (image) 83. The reference image is further evaluated by an edge processor 82 as described hereinbefore with respect to FIG. 7. The output of the edge processor 82 are xr, yr locations of features which are then mapped into the disparity image 83 to evaluate disparities at these points. This is called sparsification 85. The output of the sparsification process 85 is a plurality of feature points with disparities (xr, yr, d) which are easily converted to 3D X, Y, Z, coordinates 87 using the camera geometry 88 that is known from pre-calibration.

The stereo matching steps according to FIGS. 7 and 8 generate feature points (edges or boundary points) with 3D information at these points. Further processing of the 3D points is described with reference to FIG. 4.

The 3D points are transformed from a camera-centric coordinate system to a world coordinate system, which is attached to the ground plane in a stereo/clustering step (such as the steps described hereinbefore with respect to FIGS. 7 and 8). Optionally the 3D points are then clustered whereby once the 3D points at the features in the image are extracted they are segmented into mutually exclusive subsets. Each subset corresponds to a distinct object in the scene.

Standard clustering techniques can be used to form clusters of the 3D points. The technique that is effective is the agglomerative hierarchical clustering. Initial clusters are first achieved by using the chain organization of the edgelets. The chains of features are broken into contiguous segments based on abrupt changes in z between successive points (the theory being if they are contiguous in image coordinates and have similar z values then they correspond to the same object and hence the same cluster). Each of these segments now corresponds to a potentially separate cluster. Next the two closest clusters are merged based on a "minimum distance" criteria. This is akin to a greedy minimum spanning tree algorithm. The algorithm iterates until the desired number of clusters are obtained or the "minimum distance" is greater than a certain threshold.

The above technique clusters in 3D, however, the technique outlined below reduces the problem to a 2D problem by using constraints. The constraint that is used places the objects in a plane in 3D space. This is not a very disadvantageous restriction in a typical application. The criteria for segmentation into distinct objects is that the minimum distance between the objects along a particular plane (2D distance) exceed a preset spacing threshold. Therefore it is implicit that the projections of the objects in the plane do not overlap. This again is not very disadvantageous because the objects lie on the plane and the surfaces of the object are generally normal to the plane.

Next a filtering step 41 is performed wherein all the points that are on or close to the ground are filtered out. Any points masked out by the regions of interest that were setup during installation are ignored. Since a 3D coordinate system is first attached to the ground plane, it is assumed that the surface normal of this plane is the z-axis. This allows the selection of an arbitrary origin, x-axis, and y-axis. Since objects were constrained to lie in a known (x, y) plane, objects are segmented according to how they are separated in this plane (considering the 2D distance along the xy plane).

In the illustrative embodiment, all 3D points are first converted to the ground plane coordinate system. Next points that are too distant or close (range), too far left or right (lateral distance), too high (height of the object) or too close to the x-y plane are eliminated. Eliminating points close to the ground plane helps remove shadow and plane surface features. The remaining points that do not get filtered out are then projected into the ground plane. This can then be converted to a 2D image and standard 2D labeling/blob connectivity is used to obtain distinct regions, i.e., collection of pixels, where each pixel represents a plurality of feature points.

A scoring step 42 is then performed wherein the resulting points are then scored using a scoring function. The score is accumulated and compared against a predetermined threshold to determine if an object is present 43 or absent 44. In the illustrative embodiment, the score is accumulated independently for each cluster. The threshold then is applied to each cluster as opposed to all the points that are generated. This can be more robust especially if the scene produces a lot of isolated false matches but at the expense of more computational power.

An alternative algorithm is described with reference to FIG. 5 wherein the first part of the algorithm is similar to the algorithm of FIG. 4 except that the clustering is no longer optional but mandatory. Once an object (cluster) has been detected, a trajectory computation step is performed wherein the motion vector of the cluster is computed to further qualify the result as to whether the object is headed towards the door 52 or not 53.

Motion estimation is performed by estimating the 2D motion field or the optical flow (apparent motion) in a set of frames in an image sequence. A large number of motion estimation techniques are known in the art. Motion estimation shares some similarities with disparity estimation such as feature and correlation matching for stereo vision systems.

Other differential techniques such as optical flow methods can be used in applications having short time intervals between frames. However, in the illustrative embodiment of door sensor application, no assumption is made that the time interval between frames is small. Therefore optical flow techniques are not used in the illustrative embodiment.

One known motion estimation method involves tracking whereby, elements are followed through time using frame-by-frame motion estimates or by implicitly deriving such estimates. Block-matching schemes (used extensively in motion compensation and video compression) or area correlation schemes (as used in stereo matching) can be used to estimate motion between frames.

The illustrative embodiment uses a unique algorithm combining feature based correlation and area based correlation. Points that belong to an object are already segmented in a given frame. According to the unique correlation algorithm, these points are determined in the subsequent frame by correlating these features in an area around the expected object position in the subsequent frame. At time t−1, each object feature point contains a weight, an x and y location and a direction. At time t the rectified reference image is considered to be the "run time image". This image is run through an edge processor similar to the one described hereinbefore, to produce gradient magnitude and angle images. During the Coarse correlation step the train probes are correlated with the angle image, the correlation measure being used is the sum of absolute differences. During the fine correlation step, the magnitude image is used to produce a sharper correlation peak.

This technique has advantages over standard area correlation techniques. For example, in standard techniques the block or area that is being correlated has different motion vectors. This produces poor correlation values and, in some cases, an erroneous correlation vector. The algorithm, according to the illustrative embodiment takes advantage of the fact that the object being tracked is already segmented. The illustrative algorithm therefore focus only on those feature points and tries to find them in the subsequent frame(s).

Once a motion vector is computed from frames t to t−1 for a given object, correspondence is known between the various object points. Since the 3D locations of these points are known, 3D motion can be optionally computed. The algorithm could be trivially extended to multiple frames to get a smoothed trajectory by assuming straight line motion of objects. Another extension of the algorithm is the use of filtering techniques. The results are filtered using the current input, past inputs and outputs to produce the current output. Yet another extension is the use of Kalman filters. See R. E. Kalman, *A New Approach to Linear Filtering and Prediction Problems*, Transactions of the ASME (March 1960) which is incorporated herein by reference. The Kalman filter is a powerful technique for doing incremental, real-time estimation in dynamic systems. It allows for the integration of information over time and is robust with respect to both system and sensor noise.

The event generation logic depends on several factors: the door type, the presence of the optional outgoing area system, the algorithms in use. It should be noted that a single system itself might have multiple algorithms in use. This logic takes the outputs from various zones in the various systems and integrates them to provide events that can directly be used to control the door motion. An illustrative stereo door sensor apparatus is described with reference to FIG. 6. A stereo image acquisition device 60, for example a pair of machine vision cameras that acquires stereo images of a monitored scene is fixed and aimed at a viewing area. The viewing area in an illustrative embodiment is the incoming area in proximity to a door.

The image acquisition device 60 is in communication with (typically hard wired to) a 3D processor 62. The 3D processor 62 computes the locations of 3D objects within the viewed scene according to any of the methods described hereinbefore and filters out background 2D effects such as shadows, patterns or pre-alarm lighting effects. The 3D processor 62 can be any processing device or module capable of performing at least the minimum processing steps described hereinbefore to compute a set of 3D objects and filter 2D background information. A personal computer, a dedicated processor or any number of processing devices are capable of serving as a 3D processor according to the present invention. Persons having ordinary skill in the art should recognize that the 3D processor could also be a stand alone software module or a software module running within a larger software program.

A trajectory processor 66 is in communication with the 3D processor 64 and receives 3D positions of objects therefrom. The trajectory processor 66 can be either a hardware processor such as a personal computer or a software module capable of performing the trajectory computation steps described hereinbefore. In the illustrative embodiment, the trajectory processor 66 generates control signals (i.e. open, close or stall signals) based upon an object's trajectory and communicates the control signals to a door actuator 66 which operates the door based upon the control signals.

Although various calibration methods are described herein in terms of illustrative embodiments of the invention, persons having ordinary skill in the art should appreciate that any number of calibration methods can be used without departing from the spirit and scope of the invention. See, for example, references 1-4. Although the illustrative embodiment described herein is setup in the factory using factory setup procedures, persons having ordinary skill in the art should appreciate that any of the described setup steps can also be performed in the field without departing from the scope of the invention.

Although an interior orientation process for determining the internal geometry of cameras in terms of the camera constant, the image center, radial distortion coefficients and aspect ratio, persons having ordinary skill in the art should appreciate that additional intrinsic parameters may be added or some of these parameters ignored in alternative embodiments within the scope of the present invention.

Although ground plane calibration in the illustrative embodiments described herein is performed at the location of installation, persons having ordinary skill in the art should appreciate that ground plane calibration could also be performed in the factory or at alternate locations without departing from the spirit and scope of the invention.

Although edge processing is performed in the illustrative embodiments described herein by performing parabolic smoothing, non-integral sub sampling (at specific granularity) sobel edge detection followed by true peak detection and chaining, persons having skill in the art should appreciate that any number of edge processing methods known in the art can be used in the edge processing step without departing from the spirit and scope of the present invention.

Although the invention is described herein in terms of a two camera stereo vision system, persons skilled in the art should appreciate that a single camera can be used to take two or more images from different locations to provide stereo images within the scope of the invention. For example, a camera could take separate images from a plurality of locations. Alternatively, a plurality of optical components could be arranged to provide a plurality of consecutive views to a stationary camera for use as stereo images according to the invention. Such optical components include reflective optical components, for example, mirrors, and refractive optical components, for example, lenses.

Although the matching step of an illustrative embodiment is described herein wherein matching features are characterized by a strength of match followed by implementing a smoothness constraint, persons having ordinary skill in the art should appreciate that various alternative matching processes can be substituted, such as SAD (Sum of Absolute differences) of the LOG (Laplacian of Gaussian) transformed image or the like, therefore, without departing from the spirit and scope of the present invention.

While the illustrative embodiment of the present invention is described herein, including a merging step using a simple multiplexing scheme having specific orientation limits from which to distinguish horizontal disparities from vertical disparities, persons having ordinary skill in the art should appreciate that these limits are somewhat arbitrary and can be widened or narrowed without departing from the spirit and scope of the present invention.

Although illustrative embodiments of the present invention are described generally in terms of a stereo door sensor for selectively opening, stalling or closing a door, persons having skill in the art should envision any number of alternative embodiments of the present invention in security, safety, motion control and various other applications. For example, a stereo vision system can be used according to the present invention to trigger an alarm when a person or object enters a particular area or moves in a particular direction within that area or passageway. An alternative illustrative embodiment of the invention for example, could trigger an alert signal or close a gate if an automobile is detected traveling in the wrong direction on a highway or exit ramp.

Although illustrative embodiments of the present invention are described in terms of filtering objects having predetermined heights above the ground plain, persons having ordinary skill in the art should appreciate that a stereo vision system according to the present invention could also filter objects at a predetermined distance from any arbitrary plain such as a wall, without departing from the spirit or scope of the invention.

Although the invention has been shown and described with respect to exemplary embodiments thereof, persons having ordinary skill in the art should appreciate that various other changes, omissions and additions in the form and detail thereof may be made therein without departing from the spirit and scope of the invention.

What is claimed is:

1. A method of controlling a door comprising the steps of:
   acquiring a stereo image of an incoming area;
   computing a set of 3D features from said stereo image;
   filtering from said set of 3D features to generate a set of filtered 3D features;
   computing a trajectory of said set of filtered 3D features relative to said door; and
   generating door control signals in response to said trajectory;
   wherein said step of computing a set of 3D features includes the steps of:
   edge-processing said stereo image to generate a plurality of connected features;
   identifying connected features having a selected characteristic greater than a predetermined threshold as selected features;
   matching said selected features to generate disparities generated from different images in said image set; and
   computing 3D locations of feature points according to at least said disparities.

2. The method according to claim 1 wherein said filtering step eliminates ground plane features from said set of 3D features.

3. The method according to claim 1 wherein said filtering step eliminates shadows from said set of 3D features.

4. The method according to claim 1 wherein said filtering step eliminates background patterns from said set of 3D features.

5. The method according to claim 1 wherein said filtering step eliminates ambient lighting effects.

6. The method according to claim 1 wherein said filtering step eliminates features outside of preselected 3D zones.

7. The method according to claim 1 wherein said stereo image is acquired by combining images acquired by a stereo vision camera.

8. The method according to claim 1 wherein said stereo image is acquired by combining a plurality of images acquired by a monocular camera.

9. The method according to claim 8 wherein at least one of said plurality of images are acquired by said monocular camera via reflective optical components.

10. The method according to claim 8 wherein at least one of said plurality of images are acquired by said monocular camera via refractive optical components.

11. A stereo vision apparatus for controlling a door, said apparatus comprising:
    a stereo image acquisition device;
    a 3D processor receiving stereo images from said stereo image acquisition device;
    a trajectory processor receiving frames comprising 3D objects from said 3D processor; and
    a door actuator receiving door control signals from said trajectory processor in response to an object's trajectory relative to said door;

wherein said 3D processor generates said frames comprising 3D objects by:

determining heights above a ground plane for points in a field of view of said stereo image acquisition devices; and clustering said points in 3D space to generate objects;

wherein said clustering includes:

generating initial clusters according to chain organization of edgelets;

breaking chains of features into contiguous segments based on changes in a z coordinate between successive points; and merging two closest clusters based on a minimum distance criteria.

12. The apparatus according to claim 11 wherein said stereo image acquisition device comprises a plurality of electronic cameras.

13. The apparatus according to claim 11 wherein objects having a close proximity to said ground plane relative to a predetermined threshold are filtered out as ground plane noise.

14. The apparatus according to claim 11 wherein said trajectory processor determines an object's trajectory by tracking said objects in multiple frames.

15. The apparatus according to claim 11 wherein said stereo image acquisition device comprises a monocular camera configured for acquiring a plurality of images.

16. The apparatus according to claim 15 wherein at least one of said plurality of images are acquired via a mirror.

17. The method according to claim 1, wherein said filtering step comprises:

selecting 3D spaces of interest; and eliminating features outside said selected 3D spaces of interest.

18. The method according to claim 17 further comprising performing different run-time algorithms on each of a plurality of said 3D spaces of interest.

* * * * *